Oct. 13, 1931.     H. W. LARSON     1,826,795
INDENTURING APPARATUS
Filed June 12, 1928
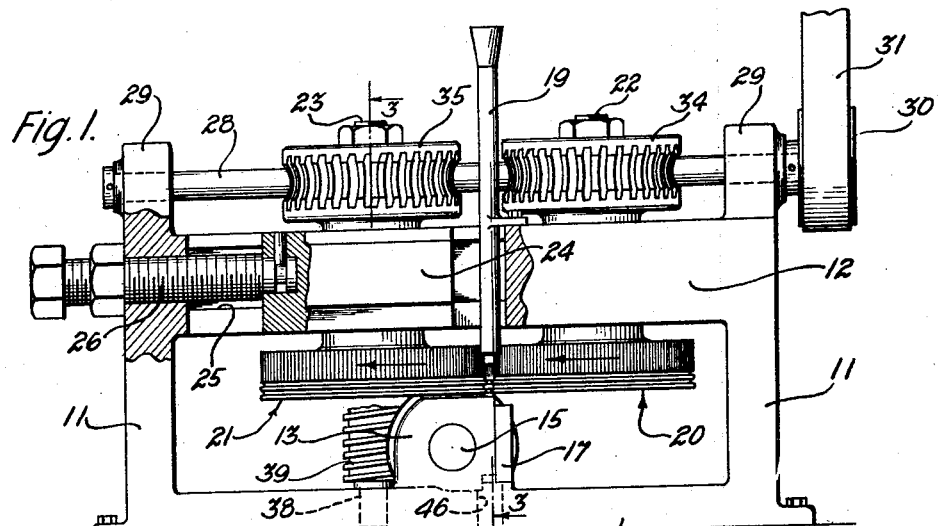
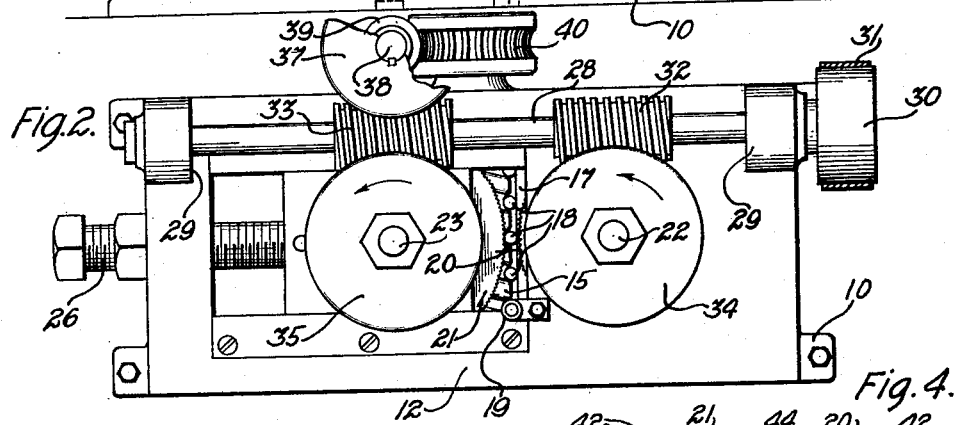
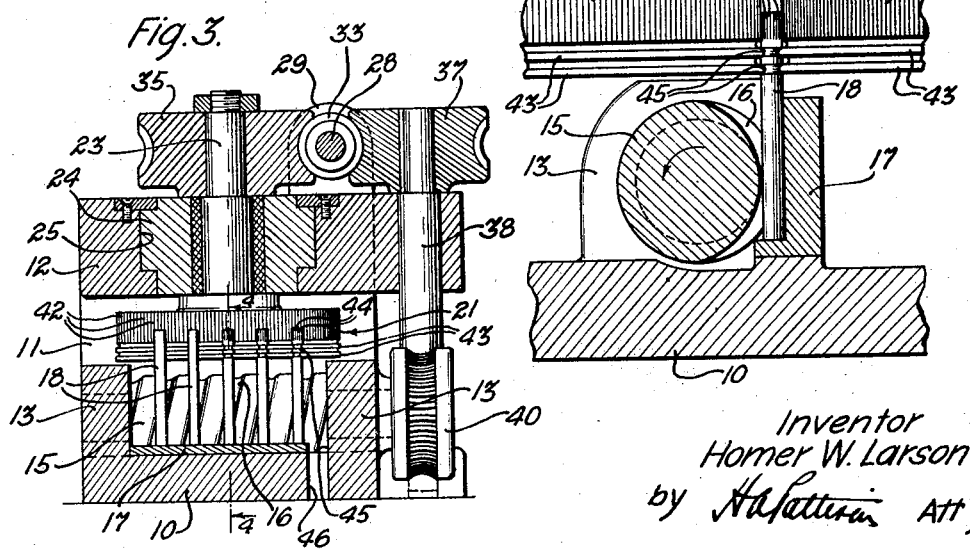
Inventor
Homer W. Larson
by H. A. Patterson Att'y Patented Oct. 13, 1931

1,826,795

UNITED STATES PATENT OFFICE

HOMER WALDO LARSON, OF DOWNERS GROVE, ILLINOIS, ASSIGNOR TO WESTERN ELECTRIC COMPANY, INCORPORATED, OF NEW YORK, N. Y., A CORPORATION OF NEW YORK

INDENTURING APPARATUS

Application filed June 12, 1928. Serial No. 284,717.

This invention relates to indenturing apparatus, and more particularly to apparatus for knurling articles which are capable of being rolled.

The primary object of the invention is to provide a simple and efficient apparatus for expeditiously and economically indenting or knurling a portion, or all, of the peripheral surface of an article.

In accordance with the general features of the invention, there is provided in one embodiment thereof an apparatus for knurling the peripheral surface of articles of circular cross section, such as cylindrical blanks. The blanks are fed from a suitable hopper to a rotating screw member which advances them between a pair of peripherally opposed indenturing or knurling rolls having co-operating knurl forming surfaces. The knurling rolls are driven in the same direction and at different peripheral speeds whereby the blanks are subjected to a rolling action and are simultaneously advanced by the rolls upon becoming engaged therebetween. The difference in the peripheral speeds of the knurling rolls is such that the rolls tend to advance the blanks at the same speed as they are advanced by the screw member.

These and other features and advantages of the invention will become apparent in the following detailed description, reference being had to the accompanying drawings, wherein Fig. 1 is a front elevational view, partly in section, of an apparatus embodying the features of the invention;

Fig. 2 is a plan view, partly in section, of the apparatus shown in Fig. 1;

Fig. 3 is a vertical section taken on line 3—3 of Fig. 1, and

Fig. 4 is an enlarged fragmentary section aken on line 4—4 of Fig. 3.

The embodiment of the invention herein illustrated and described is particularly suitable for knurling the end portions of pin blanks to facilitate their assembly with companion sleeves (not shown). These assemblies are used in the manufacture of heat coils of the type frequently employed in telephone apparatus. It should be understood, however, that the invention is capable of various other applications within the scope of the appended claims.

Referring now to the drawings, wherein like reference numerals designate corresponding parts throughout the several views, it will be observed that the main supporting frame comprises a base portion 10, spaced vertical end portions 11—11, and an integral horizontal portion 12 interconnecting the end portions and suitably spaced from the base portion. Rotatably journaled in suitable bearings 13—13 formed integral with the base 10 is a horizontally disposed screw member 15 having a spiral way 16 formed on its peripheral surface. A guide plate 17 is suitably spaced from the screw member 15 and serves to hold the pin blanks, designated in the drawing by the reference numeral 18, in a vertical position within the spiral way 16, as best shown in Fig. 4. A vertically disposed chute 19 (Fig. 1) guides the blanks from a suitable supply hopper (not shown) into the receiving end of the spiral way 16.

Positioned above the screw member 15 with their axes at right angles to the axis of the screw member are a pair of peripherally opposed cooperating knurling rolls 20 and 21. The knurling roll 20 is secured to a vertical shaft 22 (Fig. 2) rotatably journaled in the horizontal portion 12 of the supporting frame. The knurling roll 21 is secured to a vertical shaft 22 rotatably journaled in a bearing block 24 which is slidable in a dove-tailed slot 25 (Fig. 3) formed in the frame member 12. An adjusting screw 26 threaded in the supporting frame is operatively connected to the bearing block 24. This construction permits adjustment of the roll 21 with respect to the roll 20.

The screw member 15 and the knurling rolls 20 and 21 are driven from a main drive shaft 28 journaled in bearings 29—29 formed in the frame members 11—11. A pulley 30 is secured at one end of the drive shaft 28 whereby said shaft is driven by means of a belt 31 from any suitable source of power (not shown). Formed upon the drive shaft 28 are a pair of driving worms 32 and 33 (Fig. 2) which mesh with worm gears 34 and 35 fixed upon the roll supporting shafts 22 and 23, respectively. The driving worm 33 also meshes with a worm gear 37 secured to a vertical shaft 38 suitably journaled in the supporting frame. A driving worm 39 (Fig. 1) formed upon the shaft 38 meshes with a worm gear 40 secured to the screw member 15.

It will be understood that the above described driving gears are designed and arranged so that the knurling rolls 20 and 21 are driven in the same direction, as indicated by the arrows in Figs. 1 and 2. The knurling roll 21 is of larger diameter than the knurling roll 20, and since both knurling rolls are driven at the same speed, it is obvious that the peripheral speed of the larger roll 21 is greater than that of smaller roll 20. Due to this difference in the peripheral speeds of the knurling rolls, the blanks are subjected to a rolling action and are simultaneously advanced by the rolls upon becoming engaged therebetween. The screw member 15 is driven in the direction indicated by the arrow in Fig. 4, and its rotating speed is such that it advances the blanks at the same speed as they are advanced by the knurling rolls. In the present embodiment of the invention the speed at which the blanks are advanced by the screw member is equal to approximately one-half the difference in the peripheral speeds of the knurling rolls.

In the operation of the above described apparatus, the pin blanks 18 are fed, one at a time, from a suitable hopper (not shown) through the chute 19 which guides them into the spiral way 16 of the screw member 15. The blanks are held in a vertical position within the spiral way 16 by the guide plate 17 and are advanced in this position into operative engagement with the knurling rolls 20 and 21. Upon becoming engaged by the positively rotating knurling rolls, the blanks are subjected to a rolling action due to the difference in the peripheral speeds of the knurling rolls, as hereinbefore described. During this rolling action, the desired knurlings or indentations are impressed upon the engaged portion of the blank by cooperating teeth or ridges formed upon the peripheral surfaces of the knurling rolls. In the present embodiment of the invention, the upper peripheral portions of the knurling rolls are provided with a circumferential series of transverse teeth 42 which cooperate to form a circumferential series of transverse indentations 44 upon the upper end portions of the blanks; and the lower peripheral portions of the knurling rolls are provided with a series of circumferential teeth 43 which cooperate to form a series of circumferential indentations 45 upon the blanks immediately below the transverse indentations 44. After passing between the knurling rolls, the completely knurled blanks are advanced by the screw member until they drop through an opening 46 provided in the base and may be collected in a suitable pan or receptacle (not shown).

From the above description, it will be understood that by means of an apparatus embodying the features of the invention various types of knurling or indentations may be expeditiously and economically performed upon rollable articles, such as pins and the like. It is to be understood also that the novel features of the invention are capable of numerous other applications within the scope of the appended claims.

What is claimed is:

1. In an indenturing apparatus, a pair of peripherally opposed rotatable members having a series of transverse and circumferential peripheral projections, and means for driving said members in the same direction at different peripheral speeds.

2. In an apparatus for indenting articles, a pair of peripherally opposed cooperating indenturing members, means for positively driving said indenturing members, and a screw member for receiving an article between the threads thereof to advance it into operative association with said indenturing members.

3. In an apparatus for knurling rollable articles, a pair of peripherally opposed knurling rolls, means for driving said rolls in the same direction at different peripheral speeds, and a screw member for advancing a rollable article into operative association with said knurling rolls.

4. In an apparatus for knurling rollable articles, a pair of peripherally opposed knurling rolls, means for driving said rolls in the same direction at different peripheral speeds, a screw member for advancing a rollable article into operative association with said knurling rolls, and means cooperating with the screw member for positioning the article transversely with respect to the knurling roll as it is advanced by said screw member.

5. In an apparatus for knurling rollable articles, a screw member for advancing a rollable article, a pair of peripherally opposed knurling rolls arranged to engage diametrically opposed portions of the article as it is advanced by the screw member, and means for driving the knurling rolls in the same direction at different peripheral speeds whereby the article is subjected to a rolling action upon becoming operatively engaged by said rolls.

6. In an apparatus for knurling rollable articles, a pair of cooperating knurling rolls arranged to engage diametrically opposed portions of a rollable article, and means for driving said rolls in the same direction and at different peripheral speeds whereby the article is subjected to a rolling action and simultaneously advanced by the rolls.

7. In an apparatus for knurling rollable articles, a pair of peripherally opposed knurling rolls having cooperating knurling teeth, a rotatable screw member having a spiral way for advancing articles into and out of operative engagement with said knurling rolls, and a guide plate cooperating with the screw member for maintaining the advancing articles properly positioned with respect to the knurling rolls.

8. In an apparatus for knurling rollable articles, a pair of peripherally opposed knurling rolls carried upon vertically disposed parallel shafts and arranged to engage diametrically opposed portions of a rollable article, a rotatable screw member positioned below the knurling rolls with its axis at right angles to the axes of the knurling rolls, said screw member having a spiral way formed on its peripheral surface for advancing an article associated therewith into operative engagement with the knurling rolls and away from said rolls to a discharging position, and a guide member spaced from the screw member and cooperating with the spiral way thereof for positioning an advancing rollable article with its axis parallel to the axes of the knurling rolls.

9. In an apparatus for forming rollable articles, a pair of cooperating peripherally opposed forming rolls, means for rotating the rolls at different peripheral speeds to cause the rolls to advance the articles while forming them, and advancing means synchronized with the rolls and operative to advance the articles to the rolls and to advance them away from the rolls after they have been formed.

10. In an apparatus for forming rollable articles, a pair of cooperating peripherally opposed forming rolls, means for positively rotating the rolls, and advancing means synchronized with the rolls and operative to advance the articles to the rolls and to advance them away from the rolls after they have been formed, said advancing means comprising a screw member designed to receive articles between the threads thereof, and a guide member cooperating with the screw member and adapted to retain the articles in engagement with the screw member.

In witness whereof, I hereunto subscribe my name this 31 day of May, A. D. 1928.

HOMER WALDO LARSON.